United States Patent [19]

Sherman

[11] Patent Number: 5,014,941
[45] Date of Patent: May 14, 1991

[54] CABLE SUPPORT ASSEMBLY

[75] Inventor: Thomas E. Sherman, Chagrin Falls, Ohio

[73] Assignee: Preformed Line Products Company, Cleveland, Ohio

[21] Appl. No.: 167,039

[22] Filed: Mar. 11, 1988

[51] Int. Cl.[5] .................................................. F16L 3/00
[52] U.S. Cl. ....................................... 248/74.4; 248/63; 24/135 K
[58] Field of Search ............... 248/74.4, 65, 63, 316.6, 248/74.1, 62; 174/155, 156, 157, 40 R; 24/135 K

[56] References Cited

U.S. PATENT DOCUMENTS

| | | | |
|---|---|---|---|
| 1,671,659 | 5/1928 | Varney | 248/63 X |
| 4,705,243 | 11/1987 | Hartmann et al. | 248/74.1 X |
| 4,804,158 | 2/1989 | Collins et al. | 248/74.4 |

FOREIGN PATENT DOCUMENTS

| | | | |
|---|---|---|---|
| 2741880 | 4/1978 | Fed. Rep. of Germany | 248/63 |
| 2500571 | 8/1982 | France | 248/62 |
| 2569912 | 3/1986 | France | 174/40 R |
| 467781 | 6/1937 | United Kingdom | 248/63 |

Primary Examiner—Karen J. Chotkowski
Attorney, Agent, or Firm—Fay, Sharpe, Beall, Fagan, Minnich & McKee

[57] ABSTRACT

A cable support assembly including first and second generally mating body members formed of a rigid, dielectric material. A bore defined between the mating body members to receive a cushion member is formed of a dielectric material substantially less rigid than the body member material. Outwardly extending flanges on the cushion member prevent axial movement relative to the body. Similarly, a cooperating tab and notch prevent axial movement between the mating body members. An enlarged boss is formed entirely within the first body member to facilitate a method of stringing cable. The first body member is secured to an associated support structure and the second body member positioned in close proximity. A cable is strung between the body members, the cushion member than received around the cable, and the first and second body members brought into mating engagement.

9 Claims, 4 Drawing Sheets 5,014,941

CABLE SUPPORT ASSEMBLY

BACKGROUND OF THE INVENTION

This invention pertains to the art of cable support structures and more particularly to a cable support assembly for a fiber optic cable and method of stringing same.

The invention is particularly applicable to an all dielectric cable support assembly and will be described with reference thereto. However, it will be appreciated that the invention has broader applications and may be advantageously employed in supporting and stringing other cables with equal success.

The proven performance of optical fibers has resulted in an increasing use of fiber optic cables for data transmission. Fiber optic cables, though, require special handling as a result of the fragile optical fibers contained therein. Additionally, beyond the mere mechanical gripping problems that must be overcome, it is necessary to protect the fiber optic cable against electrical degradation created by strong electrical fields of nearby energized cables.

Suspension from poles or other support structures subjects cables to both dynamic and static stresses. The weight of the cable being suspended at only selected points along its longitudinal extent is the principal component of the static stress. The dynamic stress primarily arises from oscillation of the fiber optic cable. For example, aeolian vibration is a natural response resulting from wind vortices passing over the suspended cable. Oscillation of the cable can lead to fatigue damage as a result of repeated flexural bending. Some latitude must be provided by the support structure to permit limited oscillation of the cable without the adverse effect of flexural fatigue.

Other support devices do not adequately accommodate the stringing, initial, or final sag of the cable. Although a cable extends axially through the support member, it is necessary to incorporate a predetermined sag of the cable from one pole to the next pole. The amount of sag, and likewise the sag angle, will change with different temperatures and field conditions, such as the terrain and spacing between poles.

Ideally, a cable will extend in a straight line whenever possible to minimize load factors on the support members. Unfortunately, the cable must curve or deviate from its longitudinal extent. If the deviation from a straight line is not factored into the support member structure, abrasion of the fiber optic cable can result. Again, prior art devices have not adequately accommodated for less than ideal conditions encountered in the field.

Still another difficulty encountered with prior art support devices results from temporarily stringing the cable before final suspension adjustments are made. Typically, temporary supports are used for the initial stringing of the cable. Thereafter, separate, permanent support members are mounted to an associated structure such as a pole to receive the cable. The temporary supports may then be removed once the permanent support members are in place.

This method necessarily requires that at least an extra step be undertaken in order to suspend the cables. That is, the temporary support must also be secured to the pole and then removed once the permanent support members are in place. This involves a waste of time, labor, and material all at an increased cost to the consumer.

The subject invention is deemed to provide a reliable support structure particularly adapted for fiber optic cables and overcome the above-noted shortcomings of the prior art.

SUMMARY OF THE INVENTION

The present invention contemplates a new and improved apparatus for supporting cables from an associated structure, as well as an associated method of stringing cable through use of same.

According to the present invention, there is provided a cable support assembly having a two-part body formed of a dielectric material. Elongated recesses are defined in each body member to form an aperture through the body when the body members are placed in mating engagement. The body members are locked against relative axial movement and means for selectively securing the body members together is provided. A dielectric cushion member is also formed of two mating portions and received in the recesses of the first and second body members, respectively.

According to another aspect of the invention, means for limiting relative axial movement between the cushion member and body is provided.

According to yet another aspect of the invention, an enlarged boss is formed entirely on one body member for securing the support assembly to an associated structure.

According to still another aspect of the invention, generally frusto-conical tapered regions are provided at opposite ends of the body aperture.

In accordance with a method of stringing cable with the subject apparatus, a first body member is mounted to the associated support structure, a spacer inserted between the first and second body members, and the second body member secured in spaced relation to a first body member. A cable is then fed between the first and second body members and the spacer removed from therebetween. Prior to final mating engagement of the body members, a cushion member is positioned between the first and second body members around the cable.

A principal advantage of the invention resides in the unique mechanical performance characteristics of the support assembly.

Yet another advantage of the invention is found in the ability to guard against electrical degradation of the fiber optic cable received therein.

Still another advantage of the invention is found in the protection against destructive bending during unbalanced loading on the cable.

A still further advantage resides in the method of stringing the cable.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT AND METHOD

Figure 1:
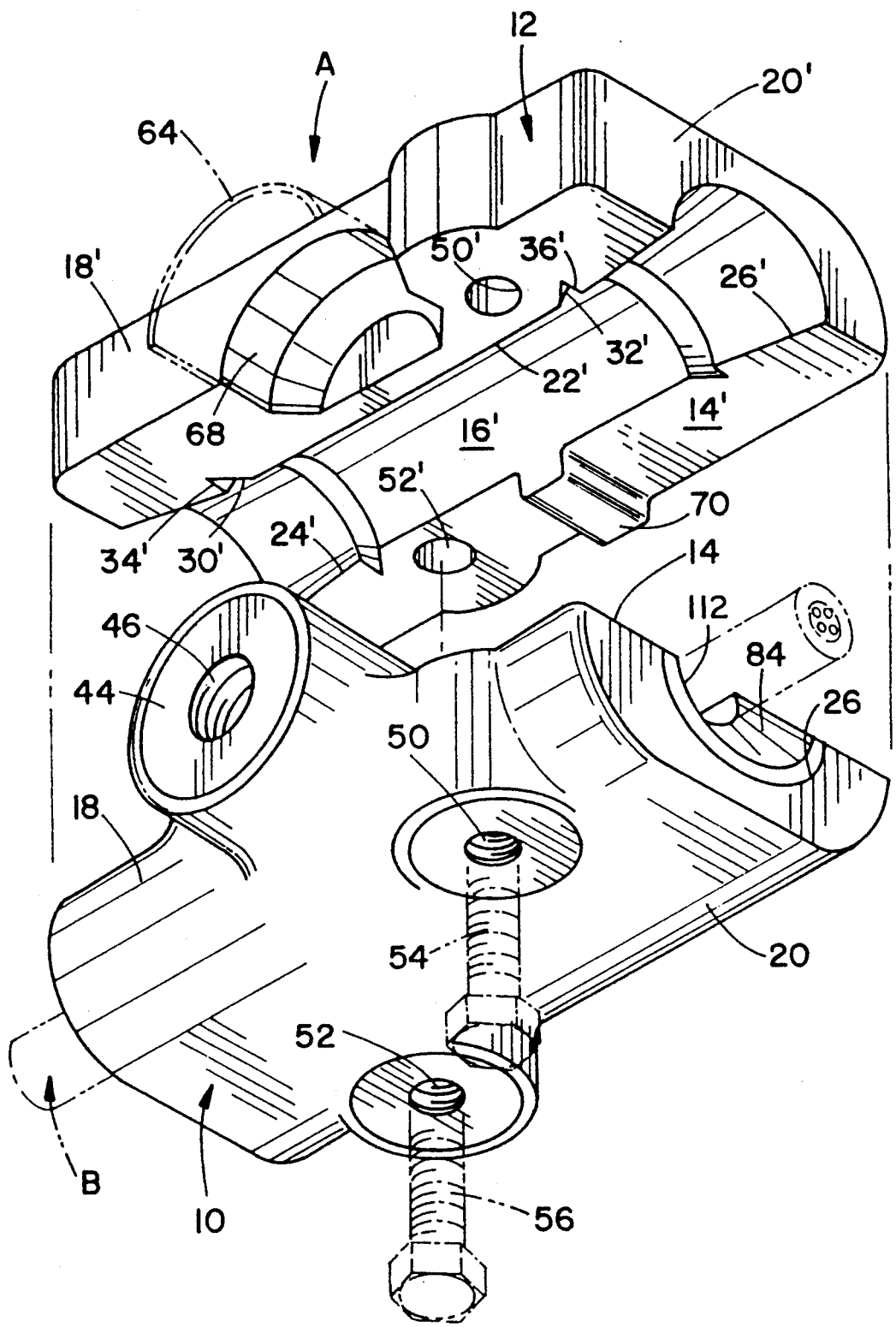
FIG. 1 is an exploded perspective view of the support assembly receiving a fiber optic cable shown in phantom therethrough.

Referring now to the drawings wherein the showings are for purposes of illustrating the preferred embodiment and method of the invention only and not for purposes of limiting same, the FIGURES show a cable support assembly A receiving a cable such as fiber optic cable B therethrough. The structural arrangement of the fiber optic cable may take various configurations, none of which form a part of the subject invention. Further discussion of the structure and function of conventional fiber optic cables is, therefore, deemed unnecessary to a full and complete understanding of the subject invention.

The cable support assembly includes a two-part body defined by first and second body members 10, 12. The body members are preferably formed of a substantially rigid urethane material. The urethane material is preferred because of its high strength and dielectrical properties. It is also contemplated that certain situations may require even higher strength properties. Incorporation of carbon or glass fibers, or similar strengthening materials, may be used to meet increased strength properties. Of course, it will be understood that still other comparable dielectric or composite dielectric materials exhibiting similar structural and functional characteristics may be used with equal success.

Figure 2A:
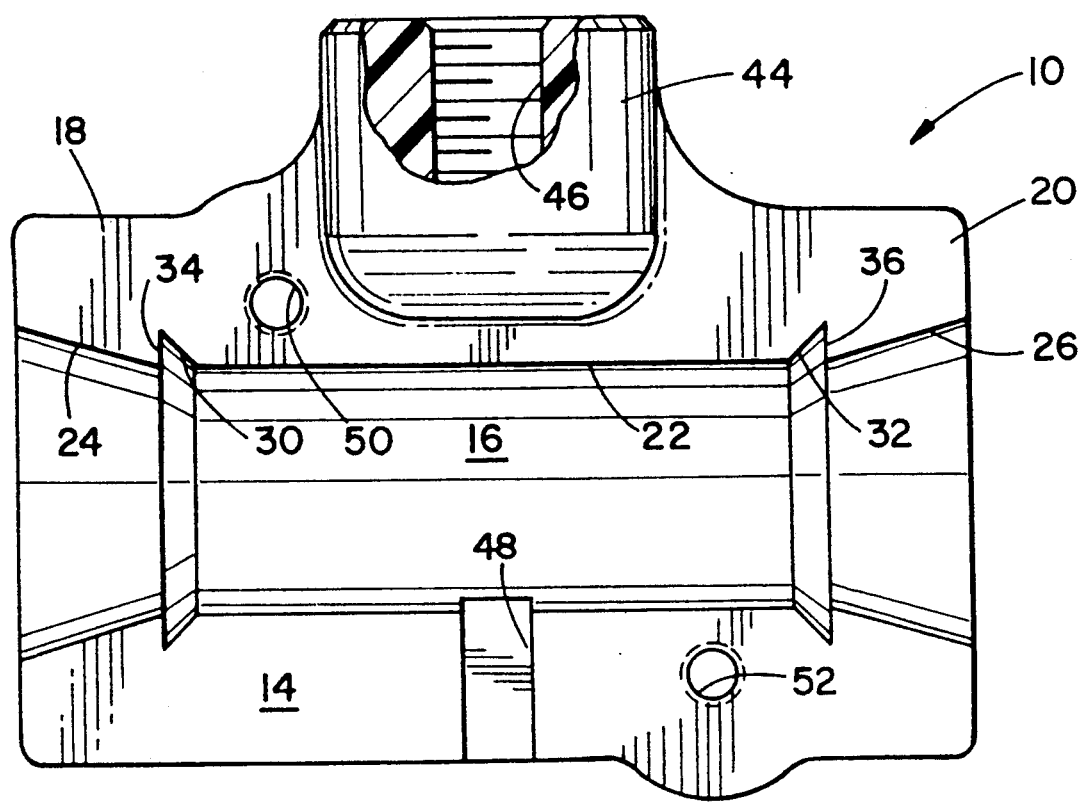
FIG. 2A is a plan view of an interior face of a first body member.
Figure 3A:
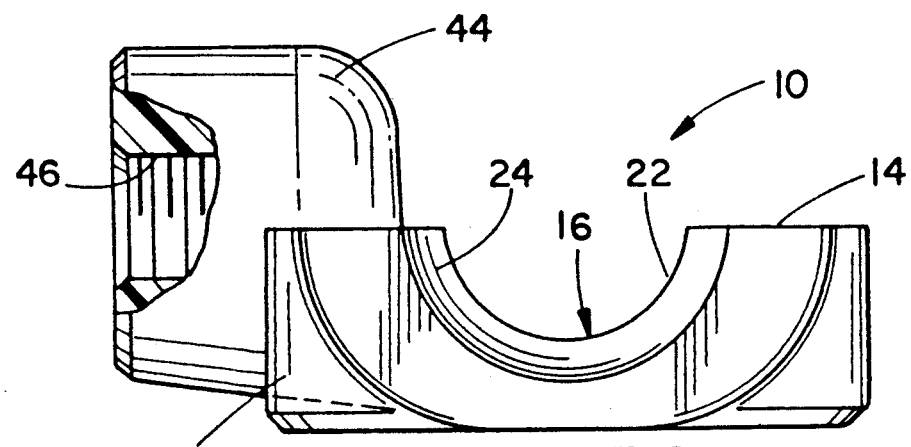
FIG. 3A is an end view of the first body member.
Figure 4A:
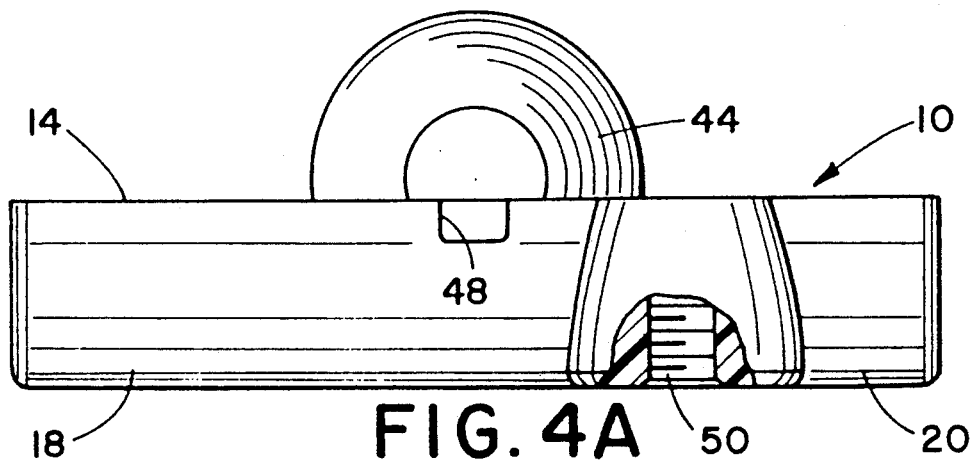
FIG. 4A is a bottom view of the first body member.

Referring now to FIGS. 2A, 3A, and 4A, the particulars of the first body member 10 will be described in greater detail. A generally planar interior face 14 includes an elongated, generally arcuate recess 16 extending axially from a first end 18 to a second end 20. The recess 16 preferably has a smooth face for reasons that will become more apparent below. The recess has an intermediate, central portion 22 of generally constant dimension and tapering regions 24, 26 increasing in diameter as the recess extends toward the respective first and second ends 18, 20. A first inset groove 30 is interposed between the central portion 22 and first tapering region 24. Likewise, a second inset groove 32 is interposed between the central portion and second tapering region 26. The grooves flare radially outward, i.e. increase in depth, as they extend axially toward their respective first and second ends. An abrupt reduction in diameter defines a shoulder 34, 36 at the merger area of the grooves 30, 32 with the respective first and second tapering regions 24, 26.

A first securing means defined by an enlarged boss 44 is centrally disposed along the axial length of the first body member. The boss is generally cylindrical in conformation and includes an internally threaded aperture 46 adapted to receive a conventional fastener (not shown) for securing the first body member to an associated structure. The boss is entirely defined in the first body member with a central axis of the aperture 46 generally aligned with the planar interior face 14.

Approximately half of the boss, therefore, extends outwardly from the first body member in a generally cantilevered arrangement. An inwardly extending cutout or notch 48 is also defined in the central portion of the first body member but on an opposite side of the recess 16 from the boss. In the preferred arrangement, the notch has a cubical conformation although other notch configurations may be used without departing from the scope and intent of the subject invention. The function and purpose of the notch will be described further hereinbelow.

First and second apertures 50, 52 extend generally perpendicular to the interior face 14 and extend entirely through the first body member. The apertures are adapted to receive selected fasteners such as bolts 54, 56, respectively. In the embodiment shown, the fasteners are selectively inserted into the apertures for securing the first and second body members together. Alternatively, though, the fasteners may be molded into either the first or second body members to facilitate assembly of the body. The first and second apertures have a predetermined positional arrangement in the body members. Specifically, the apertures 50, 52 are placed on opposite sides of the recess 16. This provides a balanced arrangement relative to a longitudinal axis of the body. Additionally, the apertures are positioned on opposite sides of the central axis of aperture 46.

Figure 2B:
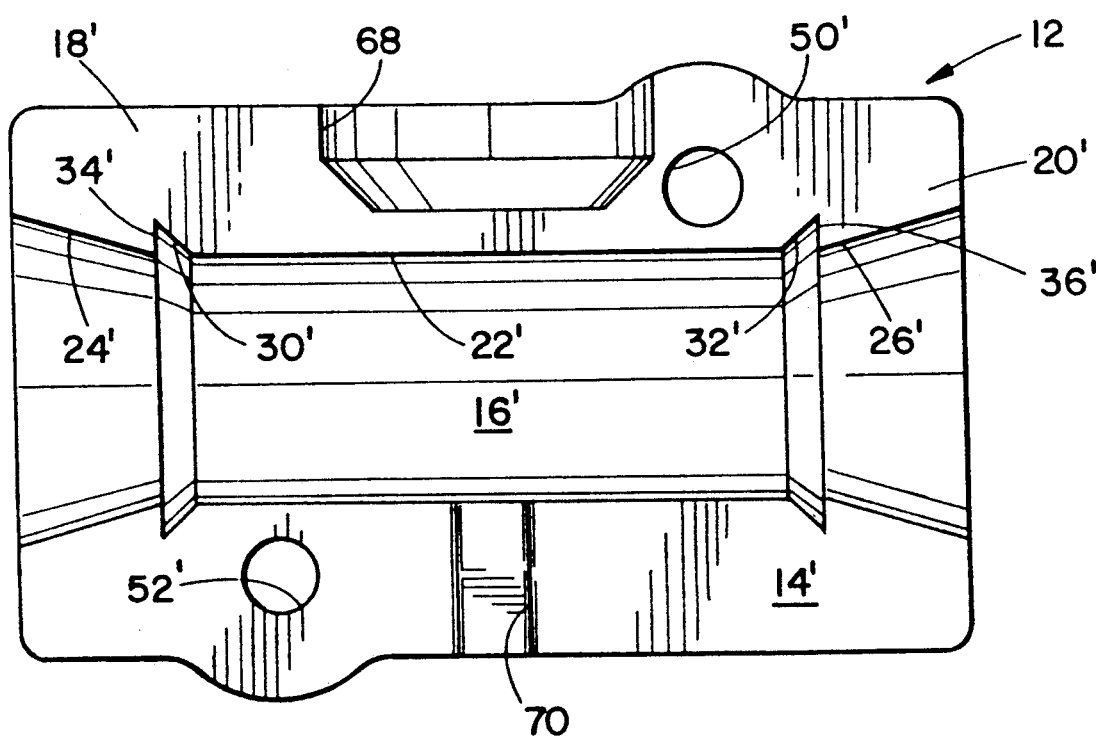
FIG. 2B is a plan view of the interior face of a second body member adapted for mating engagement with the first body member.
Figure 3B:
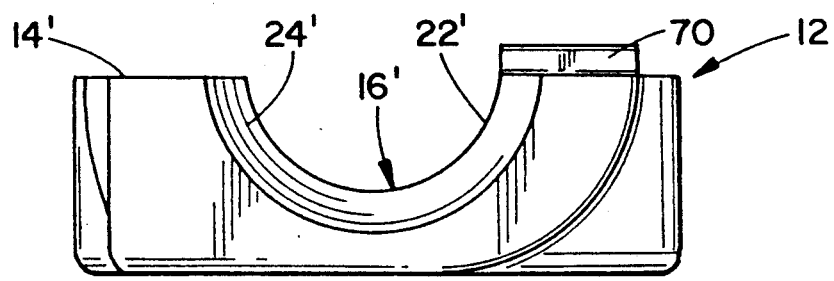
FIG. 3B is an end view of the second body member.
Figure 4B:
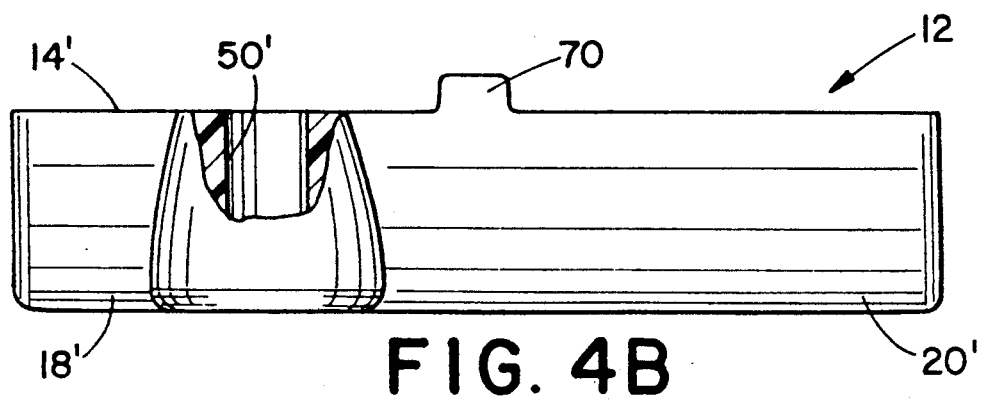
FIG. 4B is a bottom view of the second body member.

The second body member 12 is particularly illustrated in FIGS. 2B, 3B and 4B. Since the second body member is substantially identical to that of the first body member, and for ease of illustration and understanding, like elements are identified by like numerals with a primed (') suffix and new elements are identified by new numerals. The second body member includes a generally planar interior face 14' and an elongated arcuate recess 16'. First and second radially outward tapering regions 24', 26' are defined at the respective first and second ends 18', 20' of the second body member. Interposed between the tapering regions is a generally constant diameter central portion 22' defined along a major portion of the axial length of the recess.

Interposed between each tapering region and the central portion are defined first and second grooves 30', 32'. The grooves spread axially and radially outwardly to define a generally frusto-conical configuration. In fact, the grooves diverge more sharply than the tapering regions 24, 26 to define respective shoulders 34', 36' therewith.

A thin-walled sleeve 64 (FIG. 1) has a generally inner semi-cylindrical configuration adapted for mating engagement with the semi-cylindrical external surface of the boss 44 of the first body member. The thin-walled sleeve provides minor support for the boss area of the first body member when the body members are placed in mating engagement. Its primary function, though, is to facilitate alignment and orientation of the first and second body members in the field. In fact, it is contemplated that other cable support embodiments may be used without incorporating a thin-walled sleeve (FIGS.

2B, 3B, and 4B). On the other hand, a recessed well 68 is disposed between the sleeve and recess 16'. The well also accommodates the enlarged boss 44 of the first body member and is required to join the body members in mating engagement.

An outwardly extending tab 70 is disposed on the other side of the recess 16' from the well 68. The sidewalls of the tab are configured for mating receipt in the notch 48. The tab and notch cooperate to prevent or lock the first and second body members against relative axial movement when the body members are matingly secured together. As described above, still other conformations of the tab and notch may be used without departing from the scope and intent of the arrangement. First and second apertures 50', 52' define continuations of apertures 50, 52 of the first body member. The apertures 50', 52' extend generally perpendicularly to the longitudinal axis of the second body member for selective receipt of the fasteners 54, 56.

As is apparent from the exploded perspective view of FIG. 1, mating engagement between the first and second body members, particularly along the recesses 16, 16', define a longitudinally extending aperture. The thin-walled sleeve 64 and well 68 closely receive the semicylindrical surface of the boss 44 that extends outwardly from the first body member. The tab 70 and notch 48 matingly engage to limit relative axial movement between the body members, which movement is also resisted by the bolted interconnection between the body members.

Figure 5:
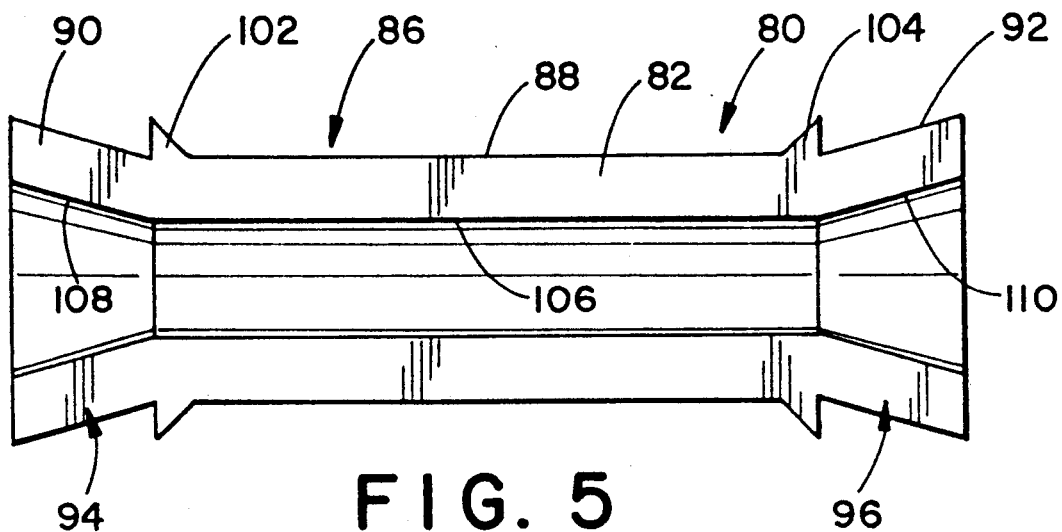
FIG. 5 is a plan view of a cushion member portion partially shown in cross-section.
Figure 6:
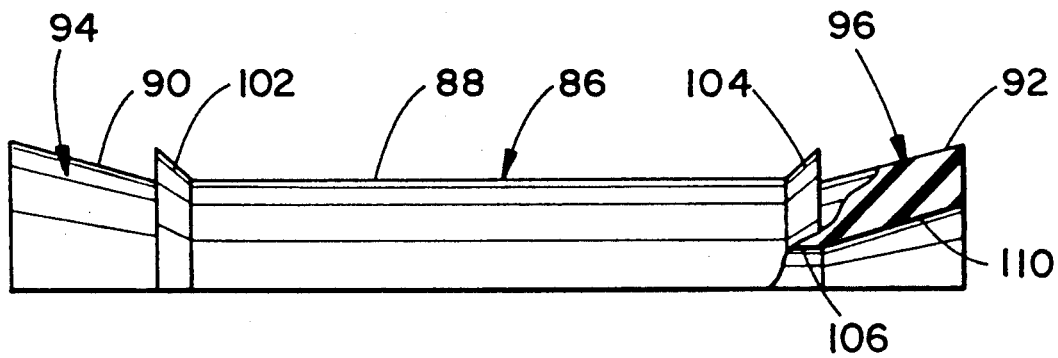
FIG. 6 is a top view of the cushion member portion.
Figure 7:
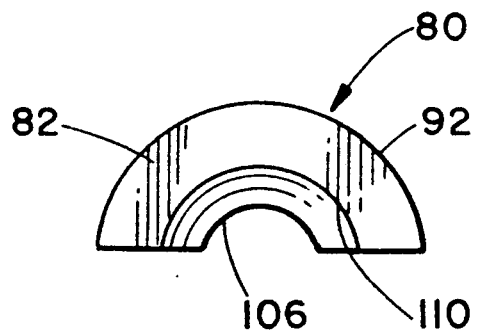
FIG. 7 is an end view of the cushion member portion according to the subject invention.

With continued reference to FIG. 1, and additional reference to FIGS. 5-7, a cushion member 80 is comprised of first and second portions 82, 84. The first and second portions are of identical construction so that description of one is applicable to the other unless specifically noted otherwise. The first cushion member portion 82 has a generally smooth-walled arcuate surface 86 that conforms to either one of the recesses 16, 16'. That is, a central region 88 of the cushion member portion has a generally constant diameter and outward tapering regions 90, 92 disposed at the first ends 94, 96 thereof. Radially outward extending flanges 102, 104 are defined at the merger areas between the central region and the respective first and second ends. The flanges have a partial, generally frusto-conical configuration and are adapted for mating receipt in the first and second grooves 30, 32 or 30', 32'.

Additionally, each cushion member portion has an elongated, generally constant diameter arcuate recess 106 that gradually expands or tapers at opposed ends 108, 110. When the first and second cushion member portions are placed in mating engagement, they define a complete cushion member having a bore or opening 112 (FIG. 1) outlined by the mating recesses 106. The bore 112 closely receives a fiber optic cable B therethrough and the expanding, tapering regions defined at each end of the cable support assembly permit limited flexing of the cable.

In the preferred embodiment, the recess 106 has a rough, grit surface to facilitate gripping the external surface of the cable. Due to the increased gripping action, the roughened surface is limited to the central portion of recess so that the tapered ends 108, 110 have a smooth-faced surface. It is also understood that in fiber optic cable configurations that employ a dual strand arrangement, i.e., one strand is defined by the strength members and the second strand carries the fragile optical fibers, only the strength member strand is subjected to the gripping action of the roughened surface.

It is also contemplated that recess 106 may have different configurations to matingly receive various external surfaces of different types of fiber optic cable. The generally tubular fiber optic cable B is easily adapted to the simple arcuate design shown in the FIGURES. On the other hand, a lashed messenger or figure "8"-type dielectric fiber optic cable requires a mating configuration by recess 106. Of course, still other configurations of the recess for receiving different types of fiber optic cables may be used without departing from the scope and intent of the subject invention.

Each cushion member portion is received in a respective first or second body member, particularly in the recess 16, 16' in the completed assembly. The external configuration of the cushion member portion closely matches that of the associated recess so that the flanges 102, 104 are seated in respective grooves 30, 32. Cooperative engagement between the flanges and the grooves limits relative axial movement between the cushion member and the body. This cooperative engagement also assists in temporarily retaining the cushion member portions in a respective body member during assembly.

Yet another advantageous feature is provided by constructing the cushion member of a urethane material that is substantially less rigid than the urethane construction of the body. This arrangement provides a cushioned or resilient gripping of the fiber optic cable that distributes the compressive forces equally around the circumference of the cable. Distribution of these forces protects the fiber optic cable from transmission losses that may result from over-compressing or crushing the fibers. The bore 106 extends through a region defined between the fastener 54, 56, i.e., longitudinally centered, between the enlarged boss 44 and the tab, and between the body members, i.e., laterally centered.

An important feature of the subject invention is the structural accommodation for unbalanced loading situations. For example, if loads imposed on the cable result in the body member rotating around the central axis of the boss, extreme forces are transferred to the fiber otic cable which can effect data transmissibility. The tapers 24, 26 and 108, 110 reduce the effect of unbalanced loading since they accommodate some movement of the cable. It is important that the central axis of boss 44 interact with the longitudinal axis of the cable as it extends through recess 106 to minimize the unbalanced loading effects.

According to a preferred method of stringing cable, the first body member is secured to an associated support structure such as a pole. The cable is received between the body members and the first and second body members brought into close proximity but maintained in spaced relationship. A separate spacer block (not shown) or other spacer member is interposed between the first and second body members to maintain the proximal, non-mating relationship. Adjustments to the sag of the cable from one support assembly to another are then made. Once the necessary adjustments are completed in stringing of the cable, the spacer block is removed and the cushion member portions received axially into the recesses 16, 16' of the first and second body members. Thereafter the fasteners are tightened and the first and second body members brought into mating engagement. This method of stringing cable in which a body member has a support means, such as boss 44, defined entirely therein eliminates the need for separate, temporary supports for stringing the cable.

The smooth-faced recess 16 facilitates stringing of the cable since it reduces friction with the cable as it passes through the closely spaced body members. Additionally, the tapers 24, 26 prevent damage to the cable during the stringing operation since they accommodate cable sag.

According to an alternate aspect of the method of stringing cable, the body members may be assembled without the cushion member portions on the ground. The assembled body is then secured to the pole and the cable fed through the recesses 16, 16'. Adjustments to the axial load and sag of the cable are made and the body members separated to receive the cushion member portions. Lastly, the fasteners are tightened to bring the body members into engagement.

The invention has been described with reference to the preferred embodiment and method. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A cable support assembly adapted for securing a fiber optic cable to an associated structure, the cable support assembly comprising:
   first and second selectively mating body members defining a body when connected together;
   said first body member having an inner face with an elongated first arcuate recess defined thereon and extending from a first end to a second end thereof, first and second axially spaced grooves defined in said first recess adjacent said first and second ends, respectively;
   said second body member having an inner face with an elongated second arcuate recess defined thereon and extending from a first end to a second end thereof, first and second axially spaced grooves defined in said second recess adjacent said first and second ends, respectively;
   said first and second recesses cooperatively defining an aperture through said body, said aperture having tapered regions at said first and second ends of the body members;
   means for selectively securing said first and second body members together;
   a cushion member formed from a dielectric material substantially less rigid than said body members, said cushion member defined by mating first and second portions received in respective body member recesses, said first and second portions each having an arcuate inner surface for closely receiving the associated fiber optic cable therethrough; and,
   first and second radially outward extending flanges defined on each cushion member portion for receipt in said body member grooves to limit relative axial movement between said cushion member and body.

2. The cable support assembly as defined in claim 1 further comprising means defined on said first and second body members for locking said body members against relative axial movement when said inner faces are disposed in abutting engagement.

3. The cable support assembly as defined in claim 1 further comprising an enlarged boss defined entirely in said first body member adapted for securing said body to an associated structure.

4. The cable support assembly as defined in claim 1 wherein said first and second body members are formed of a rigid dielectric material.

5. A cable support assembly adapted for securing a fiber optic cable to an associated structure, the cable support assembly comprising:
   a body formed of a rigid material having first and second body members;
   said first body member having an inner face, including an elongated recess extending from a first end toward a second end of said first body member;
   said second body member having an inner face of predetermined conformation for mating, abutting engagement with the inner face of said first body member and an elongated recess extending from a first end toward a second end of said second body member disposed for mating engagement with said first body member recess to define an aperture through said body;
   first means for selectively securing said first and second body members together;
   a cushion member formed from a material substantially less rigid than said body member, said cushion member including mating first and second portions, each portion having an outer surface for receipt in the body aperture and an inner surface adapted to closely receive the associated fiber optic cable therethrough, each portion further including first and second radially outward extending flanges; and,
   means for limiting relative axial movement between said cushion member and body, the limiting means including first and second grooves defined adjacent said first and second ends of said body, said grooves operatively engaging the first and second flanges on each cushion member portion.

6. The cable support assembly as defined in claim 5 wherein said body aperture has tapered regions extending from said first and second grooves to respective first and second ends of said body.

7. The cable support assembly as defined in claim 5 wherein the body is formed of a dielectric material.

8. The cable support assembly as defined in claim 5 wherein the cushion member is formed of a dielectric material.

9. The cable support assembly as defined in claim 5 wherein the body aperture has tapered regions at said first and second ends of the body members.

* * * * *